(12) United States Patent
Clark (10) Patent No.: US 8,038,744 B2
(45) Date of Patent: *Oct. 18, 2011

(54) REDUCED-EMISSION GASIFICATION AND OXIDATION OF HYDROCARBON MATERIALS FOR HYDROGEN AND OXYGEN EXTRACTION

(76) Inventor: Steve L. Clark, Highlands, TX (US)

( * ) Notice: Subject to any disclaimer, the term of this patent is extended or adjusted under 35 U.S.C. 154(b) by 1010 days.

This patent is subject to a terminal disclaimer.

(21) Appl. No.: 11/865,666

(22) Filed: Oct. 1, 2007

(65) Prior Publication Data

US 2008/0078122 A1 Apr. 3, 2008

Related U.S. Application Data

(60) Provisional application No. 60/848,697, filed on Oct. 2, 2006.

(51) Int. Cl.
*B01J 7/00* (2006.01)

(52) U.S. Cl. .............. 48/61; 48/127.9; 48/127.1; 48/76; 48/203; 48/197 R; 48/93; 48/94; 48/95; 48/127.3; 48/127.5; 48/198.3; 48/215; 48/201; 48/209; 48/210; 48/211

(58) Field of Classification Search ............... 48/127.9, 48/127.1, 76, 203, 197 R, 93, 94, 95, 127.3, 48/127.5, 198.3, 215, 201, 209–211

See application file for complete search history.

(56) References Cited

U.S. PATENT DOCUMENTS

| 2,102,427 A | 12/1937 | Lloyd et al. |
| 2,143,283 A | 1/1939 | Schmidt |
| 3,001,373 A | 9/1961 | Eastman et al. |
| 3,403,643 A | 10/1968 | Denig |
| 3,628,332 A | 12/1971 | Kelmar |
| 3,661,719 A | 5/1972 | Kelmar |
| 3,779,212 A | 12/1973 | Wagner |

(Continued)

FOREIGN PATENT DOCUMENTS

EP 0-503910 A1 9/1992

(Continued)

OTHER PUBLICATIONS

International Search Report with Opinion of the International Search Authority, PCT/US08/62592, Clark, dated Aug. 6, 2008.

(Continued)

*Primary Examiner* — Kaity V. Handal
(74) *Attorney, Agent, or Firm* — Douglas W. Rommelmann; Andrews Kurth LLP (57) ABSTRACT

A system and process for maximizing the generation of marketable products from a variety of hydrocarbon feedstocks. The hydrocarbon feedstocks are first gasified and then oxidized in a two-chamber system and process using oxygen gas rather than ambient air. Intermediate gases generated in the system and process are recirculated and recycled to the gasification and oxidation chambers in order to maximize both energy generation and the resulting stoichiometric reaction products. The energy produced through the system and process is used to generate steam and produce power through conventional steam turbine technology. In addition to the release of heat energy, the hydrocarbon feedstocks are oxidized to the pure product compounds of water and carbon dioxide. The carbon dioxide is subsequently purified and marketed. The water recovered from the system and process is collected and electrolyzed to generate oxygen and hydrogen gases. These gases are separated using conventional gas separation technologies and also marketed. The system and process minimizes environmental emissions.

18 Claims, 3 Drawing Sheets

U.S. PATENT DOCUMENTS

| | | | |
|---|---|---|---|
| 3,859,174 A | 1/1975 | Taylor | |
| 3,861,330 A | 1/1975 | Santoleri | |
| 3,861,332 A | 1/1975 | Itasaka | |
| 3,861,334 A | 1/1975 | Stockman | |
| 3,905,745 A | 9/1975 | Konda | |
| 4,111,636 A | 9/1978 | Goldberg | |
| 4,143,515 A | 3/1979 | Johnsen | |
| 4,344,486 A | 8/1982 | Parrish | |
| 4,358,344 A | 11/1982 | Sass et al. | |
| 4,437,419 A | 3/1984 | Hertel | |
| 4,520,741 A | 6/1985 | Carbeau et al. | |
| 4,542,114 A | 9/1985 | Hegarty | |
| 4,620,492 A | 11/1986 | Vogg et al. | |
| 4,656,972 A | 4/1987 | Shimoda | |
| 4,665,688 A | 5/1987 | Schiffers et al. | |
| 4,714,032 A | 12/1987 | Dickinson | |
| 4,762,074 A | 8/1988 | Sórensen | |
| 4,782,772 A | 11/1988 | Chughtai et al. | |
| 4,827,854 A | 5/1989 | Collette | |
| 4,829,911 A | 5/1989 | Nielson | |
| 4,852,344 A | 8/1989 | Warner | |
| 4,860,670 A | 8/1989 | Jorgensen | |
| 4,922,841 A | 5/1990 | Kent | |
| 5,016,599 A | 5/1991 | Jubb | |
| 5,035,188 A | 7/1991 | Johnson et al. | |
| 5,041,144 A | 8/1991 | Lath | |
| 5,050,508 A | 9/1991 | Wilson | |
| 5,120,517 A | 6/1992 | Elshout | |
| 5,129,331 A | 7/1992 | Merritt et al. | |
| 5,134,944 A | 8/1992 | Keller et al. | |
| 5,179,903 A | 1/1993 | Abboud et al. | |
| 5,188,041 A | 2/1993 | Noland et al. | |
| 5,222,446 A | 6/1993 | Edwards et al. | |
| 5,309,850 A | 5/1994 | Downs et al. | |
| 5,313,895 A | 5/1994 | Sekiguchi et al. | |
| 5,339,755 A | 8/1994 | Smith | |
| 5,344,627 A | 9/1994 | Fujii et al. | |
| 5,402,739 A | 4/1995 | Abboud et al. | |
| 5,403,569 A | 4/1995 | Abdelmalek | |
| 5,450,801 A | 9/1995 | Abboud | |
| 5,452,763 A | 9/1995 | Owen | |
| 5,467,722 A | 11/1995 | Meratla | |
| 5,500,194 A | 3/1996 | Bell | |
| 5,518,621 A | 5/1996 | Holcombe et al. | |
| 5,553,556 A | 9/1996 | Krüger | |
| 5,645,730 A | 7/1997 | Malachosky et al. | |
| 5,648,053 A | 7/1997 | Mimura et al. | |
| 5,659,110 A | 8/1997 | Herden et al. | |
| 5,662,050 A | 9/1997 | Angelo, II et al. | |
| 5,665,319 A | 9/1997 | Hirama et al. | |
| 5,709,077 A | 1/1998 | Beichel | |
| 5,711,770 A | 1/1998 | Malina | |
| 5,724,805 A | 3/1998 | Golomb et al. | |
| 5,732,571 A | 3/1998 | Maerz et al. | |
| 5,827,903 A | 10/1998 | White | |
| 5,906,806 A | 5/1999 | Clark | |
| 6,024,029 A | 2/2000 | Clark | |
| 6,119,606 A | 9/2000 | Clark | |
| 6,137,026 A | 10/2000 | Clark | |
| 6,187,226 B1 | 2/2001 | Detering et al. | |
| 6,333,015 B1 * | 12/2001 | Lewis | 423/437.2 |
| 6,688,318 B1 | 2/2004 | Clark | |
| 2004/0134517 A1 | 7/2004 | Clark | |
| 2007/0087249 A1 * | 4/2007 | Lee et al. | 429/33 |
| 2008/0184621 A1 * | 8/2008 | Clark | 48/76 |
| 2008/0275278 A1 * | 11/2008 | Clark | 585/240 |

FOREIGN PATENT DOCUMENTS

| | | |
|---|---|---|
| JP | 5-126324 A | 5/1993 |
| JP | 6-099013 A | 4/1994 |

OTHER PUBLICATIONS

Metz, Bert, et al. Eds., "IPCC Special Report on Carbon Dioxide Capture and Storage," Published for the Intergovernmental Panel on Climate Change, Cambridge University Press, 2005, Chpt. 3, pp. 105-178.

Johnson A. A., Ziock H.J. "Variations on zero emission carbon," Proc. of the CCT 2002, Chia Laguna, Italy, Oct. 2002.

Olsen, John C. Ph.D., D.Sc. "Unit Processes and Principles of Chemical Engineering," pp. 1-3, D. Van Nostrand Company, Inc., New York, 1932.

Felder, Richard M., Rousseau, Ronald W., "Elementary Principles of Chemical Processes," p. 106, John Wiley & Sons, New York, 1978.

* cited by examiner

REDUCED-EMISSION GASIFICATION AND OXIDATION OF HYDROCARBON MATERIALS FOR HYDROGEN AND OXYGEN EXTRACTION

CROSS REFERENCE TO RELATED APPLICATION

This application is based upon U.S. provisional patent application No. 60/848,697, filed on Oct. 2, 2006, the priority of which is claimed. Of even date herewith, Applicant is filing a related application entitled, "Reduced-Emission Gasification and Oxidation of Hydrocarbon Materials for Power Generation," claiming the benefit of U.S. provisional patent application No. 60/848,830.

BACKGROUND OF THE INVENTION

1. Field of the Invention

This invention relates to the complete combustion of hydrocarbon materials to maximize the generation of energy and stoichiometric products. In particular, the invention relates to a complete combustion process and system which is arranged and designed to gasify and oxidize a variety of solid and/or liquid hydrocarbon materials to produce energy, carbon dioxide, and water. The invention further relates to recycling and optimizing intermediate compounds produced through the gasification and oxidation processes to maximize energy, carbon dioxide, and water production. More particularly, the invention relates to the complete combustion of hydrocarbon feedstocks and the subsequent electrolysis of the water product to generate recoverable oxygen and hydrogen gases.

2. Description of the Prior Art

Gasification is a thermo-chemical process that converts hydrocarbon-containing materials into a combustible gas called producer gas. Producer gas contains carbon monoxide, hydrogen, water vapor, carbon dioxide, tar vapor and ash particles. Gasification produces a low-Btu or medium-Btu gas, depending on the process used. Producer gas contains 70-80% of the energy originally present in the hydrocarbon feedstock. The producer gas can be burned directly for heat energy, or it can be burned in a boiler to produce steam for power generation. Medium-Btu producer gas can be converted into a liquid fuel, such as methanol.

Solid/liquid hydrocarbon gasification is a two-stage process. In the first pyrolysis stage, heat vaporizes the volatile components of the hydrocarbon in the absence of air at temperatures ranging between 450° to 600° C. (842° to 1112° F.). Pyrolysis vapor consists of carbon monoxide, hydrogen, methane, volatile tars, carbon dioxide, and water. The charcoal (char) residue contains about 10-25% of the original feedstock mass. The final stage of gasification is char conversion which occurs at temperatures between 700° to 1200° C. (1292° to 2192° F.). The charcoal residue from the pyrolysis stage reacts with oxygen to produce carbon monoxide as a product gas.

The gasification process is, therefore, a controlled process wherein sufficient air/oxygen is provided to the gasifier to facilitate the conversion (i.e., reduction) of most tar, char, and other solid gasification products into synthetic gas (i.e., syngas), consisting primarily of carbon monoxide and hydrogen. Thus, the vast majority of products resulting from the gasification process are intermediate volatile gases. Gasification processes may use either air or oxygen to reduce the organic content of the waste. Oxygen reduction has the advantage of preventing the syngas from becoming diluted with nitrogen.

Gasification (and pyrolysis) are thermal reactions carried out to less than full oxidation by restricting the available oxygen/air. These processes always produce gas. Moreover, they can be optimized to produce mainly syngas, which has a significant fuel value. The production of dioxin is also very low in gasification due to the restricted availability of oxygen. In fact, dioxin emission in exhaust gases and its concentration in the gasification residues have proved to be below detectable limits. Gasification reactions are typically exothermic. However, syngas contains virtually all of the energy of the original hydrocarbon feedstock. For example, syngas produced through the gasification process can then be combusted at a temperature of 850° C. to provide an exhaust gas containing essentially all the energy of the original feedstock.

Current gasification technologies generally utilize processed waste or refuse-derived-fuel (RDF) containing a 6 to 7% moisture content to produce syngas. Gasification temperatures are normally maintained in the range of 600° to 1200° C. This moisture content enables hydrolysis and gasification to occur together. Conversion efficiency varies, but efficiencies as high as 87% have been reported. At high temperatures, oxygen preferentially reacts with carbon to form carbon monoxide/carbon dioxide rather than with hydrogen to form water. Thus, hydrogen is produced at high temperatures, especially when there is an insufficient oxygen/air supply to the gasifier.

The syngas produced from the gasification of 1 mole of $C_{20}H_{32}O_{10}$ has an energy content of 7805 kilojoules (kJ). In contrast, the energy content of 1 mole of $C_{20}H_{32}O_{10}$ that is released upon combustion is 8924 kJ. The energy required to heat the hydrocarbon feedstock to gasification temperatures accounts for this difference in available energy content. In this example, the efficiency of converting the RDF to syngas fuel is 87.5%. Based on these values, the total energy produced through gasification of the RDF would be 0.87 times the combustion value of the RDF.

The oxidation process is simply the exothermic conversion of producer gas to carbon dioxide and water. In a traditional combustion process, gasification and oxidation occur simultaneously. In the combustion process, the intermediate gasification products are consumed to produce carbon dioxide, water, and other less desirable combustion products, such as ash. For example, burning a solid hydrocarbon, such as wood, produces some pyrolytic vapors, but these pyrolytic vapors are immediately combusted at temperatures between 1500° to 2000° C. to produce carbon dioxide, water and other combustion products. In contrast, the gasification process is controlled, allowing the volatile gases to be extracted at a lower temperature before oxidation. Oxidation varies from incineration processes in that oxidation alters a compound by adding an electro-positive oxygen atom to the compound whereas incineration yields heat by reducing a compound to ash.

The invention disclosed herein optimizes the controlled environment of the gasification and oxidation processes through ingenious product recycle streams and operating conditions. The invention thus provides maximum energy production and product utilization from a given hydrocarbon feedstock with minimal atmospheric emissions.

The underlying technologies described herein are further disclosed in U.S. Pat. Nos. 5,906,806; 6,024,029; 6,119,606; 6,137,026; and 6,688,318, all of which are issued to Clark and hereby incorporated by reference. U.S. Patent Publication No. 2004/0134517, also by Clark, discloses related technologies and is hereby incorporated by reference. This application is based upon U.S. provisional patent application No. 60/848,697, also by Clark, which is hereby incorporated by reference.

SUMMARY OF THE INVENTION

An innovative closed system process is disclosed which utilizes mature, proven technologies to recycle and optimize energy conversion from hydrocarbon feedstocks. This process is based on oxidation, which is the process of altering compounds by adding an electro-positive oxygen atom to the compound. This process differs from incineration, which is the process of reducing a compound to ash. The main difference is that oxidation relies on the total mass balance. This means little, if any, product from the invention is vented to the atmosphere. Instead, virtually all combustion products are captured and marketed as process products. The products from the system are highly refined and thus possess a higher than average market value. Furthermore, the system and process is arranged and designed to qualify under current law as a recycling system with attractive tax and other benefits.

The preferred oxidation process is unique in that the system utilizes no ambient air. Therefore, little to no nitrous oxides or sulfur dioxides are formed in the combustion process. Because atmospheric air contains approximately 80% nitrogen, the total mass carried through the preferred system/process is 80% less than a system/process using ambient air. Furthermore, this equates to a 50% reduction in system size to achieve the same throughput as a system using ambient air (i.e., conventional technology).

Nitrogen present in the ambient air naturally retards combustion, therefore implementations of the invention, which do not use ambient air (i.e., 80% nitrogen), such as one or more implementations described herein, are able to attain much higher combustion temperatures more quickly and with less feedstock conversion. The oxygen-carbon dioxide synthetic air used in the invention also has a higher heat transfer rate for boiler efficiency than air at the same temperature. With higher boiler temperatures, greater efficiencies in power generation may be achieved. These greater boiler/power generation efficiencies are accomplished without the atmospheric discharge of nitrous oxides (NOx) or other negative effects associated with conventional gas or coal-fired plants with traditional smoke stacks.

In one implementation of the invention, the flue gas generated by gasification/oxidation is converted to useful products and intermediates through the purification process. This affords certification of process quality and is much different than other more conventional technologies that release flue gas through a smoke stack at high velocity. A further benefit of the purification process is that virtually all of the end products are capable of being marketed, a benefit that substantially offsets the cost of system operation and improves profitability.

To maximize the marketability of process end products, the water product and recovered water quench from the complete combustion process are electrolyzed to generate oxygen and hydrogen gases. The oxygen and hydrogen gases are separated into their pure components using membrane separation technologies, pressure swing adsorption, or other separation technologies known to those skilled in the art. These separated, purified products are then marketed and sold as value-added products resulting from the complete combustion process. Alternatively, the purified oxygen may be reused as a feedstock in the process/system described herein to aid in the complete combustion of additional hydrocarbon feedstocks.

A preferred implementation of the invention is a very efficient system/process for generating electricity and/or purifying water, even when less desirable feedstocks, such as clean/dirty coal, lignite, scrap tires, biomass, and/or other low-grade feedstocks, are consumed. The gasification/oxidation process described herein recovers a much higher percentage of recoverable heat energy by its very nature than other systems that utilize ambient air in the combustion process. Avoiding the process and control of large amounts of stack gas pollutants also provides significant operating cost savings and advantages.

With virtually none of the disadvantages associated with conventional low-grade hydrocarbon feedstock combustion for power generation, i.e., no smoke stack, health dispersion models, regulated compounds or incinerators, the preferred process and system of the invention described herein have qualified under current statutes as being exempt from air quality permits from both state and federal environmental regulatory agencies. With this qualification, there is no requirement under Title 40 of the Code of Federal Regulations to open the environmental impact statement to public comment. This reduction in the regulatory permitting process provides a time savings of up to three years for the installation of this system/process as compared to other more conventional combustion technologies. Additionally, the location of the facility for the system/process is not of great public interest, because there are minimal (or even zero) emissions from the system/process.

BRIEF DESCRIPTION OF THE DRAWINGS

The invention is described in detail hereinafter on the basis of the implementations represented in the accompanying figures, in which.

DESCRIPTION OF THE PREFERRED EMBODIMENTS OF THE INVENTION

In a preferred embodiment of the invention, a gasification/oxidation process and system maximizes the generation of marketable products from the complete combustion of various hydrocarbon feedstocks with minimal (or zero) environmental emissions. The product water generated by the process as well as any quench water recovered from the process are collected and then electrolyzed to generate oxygen and hydrogen gases. The oxygen and hydrogen gases are separated into their pure components using membrane separation technologies, pressure swing adsorption, or other separation technologies known to those skilled in the art. These separated, purified products are then marketed and sold as value-added products resulting from the complete combustion process. Alternatively, the purified oxygen may be reused in the system/process described herein to aid in the complete combustion of additional hydrocarbon feedstock. The complete combustion portion of the system and process, illustrated in FIGS. 1A and 1B, comprises generally a primary combustion chamber 10 and a secondary combustion chamber 10 for gasifying and oxidizing, respectively, the hydrocarbon feedstock 21 to carbon dioxide, water, and energy.

Figure 1A:
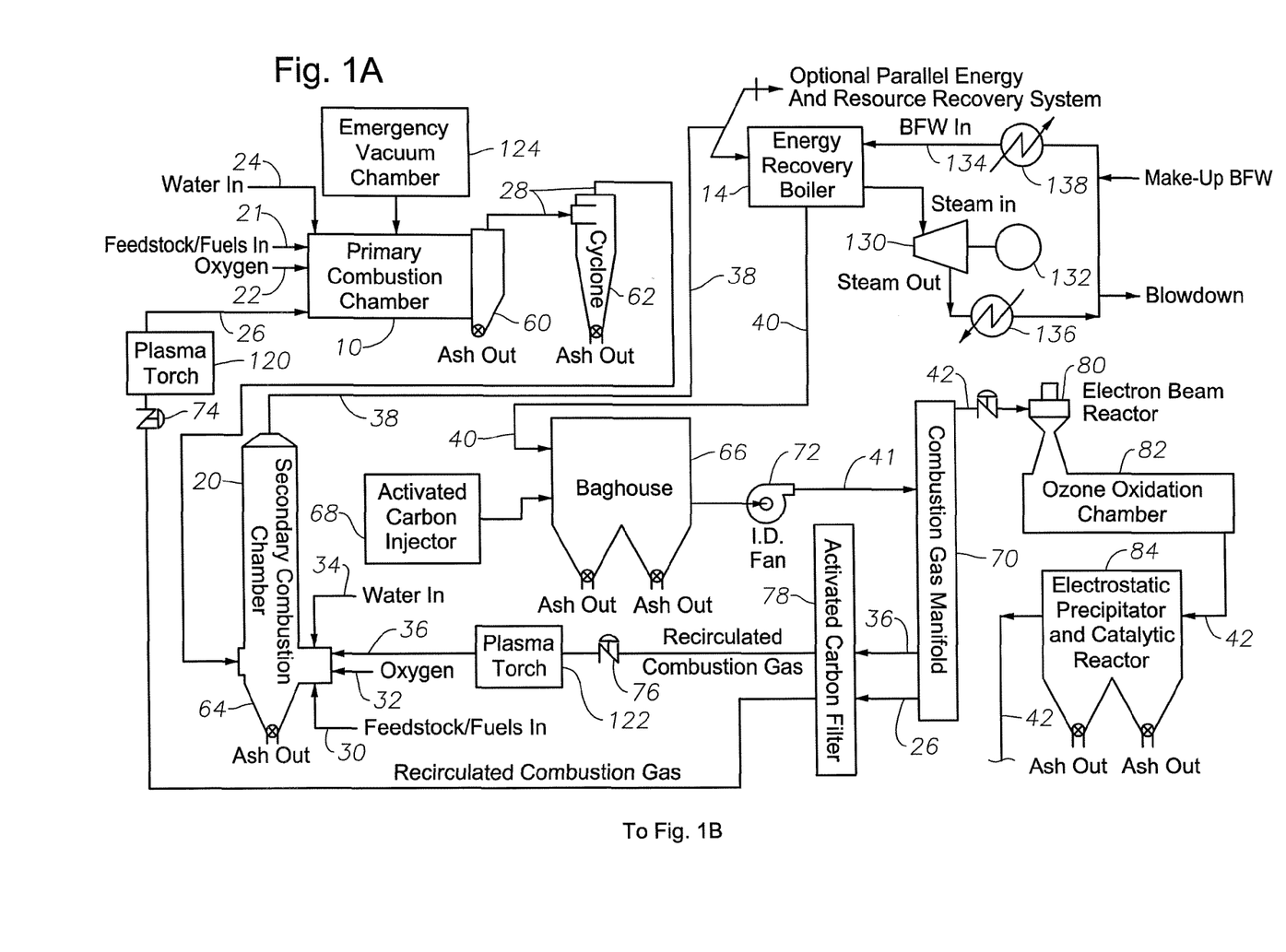
FIGS. 1A and 1B illustrate preferred implementations of the system and process for maximizing the generation of electrical power and marketable products from the complete combustion of various hydrocarbon feedstocks using a two-chamber gasifier and oxidizer while producing minimal (or zero) environmental emissions.

As illustrated in FIG. 1A, the process of a preferred embodiment of the invention begins by introducing a feedstock stream 21, oxygen stream 22, and a water stream 24 into primary combustion chamber 10. Feedstock stream 21 can be a variety of hydrocarbon feedstocks, including natural gas, coal, biomass, and other hydrocarbon-containing compounds. Within primary combustion chamber 10, the hydrocarbon feedstock 21 is converted to carbon dioxide, methane, carbon monoxide and hydrogen via the following three principal chemical reactions, listed in order by the preferential affinity of carbon to oxygen in view of all other possible combustion reactions:

Primary Chamber $C + O_2 \rightarrow CO_2$ Exothermic Reaction $C + 2H_2 \rightarrow CH_4$ Exothermic Reaction $C + H_2O \rightarrow CO + H_2$ Endothermic Reaction The preferred internal operating conditions of the primary combustion chamber 10 comprise a 5% oxygen lean (i.e., starved or deficient) atmosphere with a temperature of approximately 985° F. and an internal pressure of about 10 psia (i.e., below atmospheric pressure). However, the system and process will also work well when operated under oxygen rich conditions. As an additional safety feature to enhance the safety associated with the process, the primary combustion chamber 10 is connected to an emergency vacuum chamber 124. Primary combustion chamber 10 also has an ash separation section 60 for removing a portion of solid components including ash that results from the combustion process. Combustion product 28 is then introduced into a separation cyclone 62 to remove additional ash and solids. Separation cyclone 62 is of a variety commonly known to those skilled in the art of combustion process. After the ash is removed, combustion product stream 28 is then introduced into secondary combustion chamber 20.

Preferably, secondary combustion chamber 20 is a vertical combustion chamber such as is known by those of ordinary skill in the art. Hydrocarbons from combustion product stream 28 are reacted with an additional feedstock stream 30, a second substantially pure oxygen stream 32, and a second water stream 34 in secondary combustion chamber 20. Feedstock stream 30 can be a variety of hydrocarbon feedstocks, including methane and other hydrocarbon-containing compounds. The preferred internal operating conditions of the secondary combustion chamber 20 comprise a 5% oxygen rich atmosphere with a temperature of approximately 2,400° F. This condition causes stoichiometric oxidation resulting in a synthetic air environment of carbon dioxide and water. The formation of carbon dioxide and water (i.e., steam) in the secondary combustion chamber 20 is an auto-thermal driven process that can be summarized by the following three principal chemical reactions, listed in order by the preferential affinity of carbon to oxygen in view of all other possible combustion reactions of the gases produced in the primary combustion chamber 10:

Secondary Chamber $2CO + O_2 \rightarrow CO_2$ Exothermic Reaction $2H_2 + O_2 \rightarrow 2H_2O$ Exothermic Reaction $CH_4 + 2O_2 \rightarrow CO_2 + 2H_2O$ Exothermic Reaction Reaction product stream 38, consisting primarily of carbon dioxide and water, exits from the top of secondary combustion chamber 20. Solids, ash, and other particulate matter are removed from a bottom cone section 64 of secondary combustion chamber 20. Secondary combustion chamber 20 is included in the process to produce high combustion efficiency.

A feature of the overall process is recovering energy, in the form of heat, from reaction product stream 38 leaving the secondary combustion chamber 20. In fact, the reactions occurring in the process after the secondary combustion chamber 20 are designed to be endothermic. This is done for the beneficial purpose of moderating gas temperatures in the absence of the natural nitrogen blanket associated with the use of ambient air. Preferably, an energy recovery boiler 14 is used to recover the heat energy from reaction product stream 38. As those skilled in the art will recognize, energy recovery boiler 14 is used to generate steam by transferring the heat energy from reaction product 38 to a boiler feedwater stream 134 from boiler feedwater pre-heater 138. A portion of stream 38 can be used in parallel with energy recovery boiler 14 to heat other process streams through heat integration (i.e., cross exchanges of energy). Alternatively, other types of heat exchangers (not shown) can be used to recover the heat energy from reaction product stream 38 in place of energy recovery boiler 14. Removal of the heat energy from stream 38 in recovery boiler 14 results in a cooler stream temperature of approximately 1,200° F. Preferably, stream 38 is cooled to about 450° F.

Cooled reaction product stream 40 is then introduced into a bag house 66 for removal of particulate matter from cooled reaction product stream 40. Bag house 66 is of a design commonly known and used by those skilled in the art. Preferably, an activated carbon injector 68 can be utilized along with bag house 66 to assist in removal of particulate matter. Upon exiting bag house 66, product stream 41 is introduced into combustion gas manifold 70. Fan 72 can be used to increase the pressure of product stream 41 prior to introduction of product stream 41 into gas manifold 70.

In gas manifold 70, product stream 41 is split into three streams. Stream 42, containing the bulk of the flue gas, is routed to gas polishing 16 and purification/recovery 18 units. The remaining two streams 26 and 36 are recirculated to the primary 10 and secondary 20 combustion chambers, respectively, to maintain the oxidation environment and increase the combustion efficiency. Stream 26 is recirculated to primary combustion chamber 10 through activated carbon filter 78 and plasma torch 120. Likewise, stream 36 is recirculated to secondary combustion chamber 20 through activated carbon filter 78 and plasma torch 122. Plasma torches 120 and 122 are of a variety commonly known to those skilled in the art. The amount of recirculating combustion gas introduced into primary combustion chamber 10 is controlled by control valve 74 or other means of regulating flow volume. Similarly, the amount of recirculating combustion gas introduced into secondary combustion chamber 20 is controlled by control valve 76 or other means of regulating flow volume. Preferably, the temperature of the recirculated flue gas is reduced to approximately 175° F. just prior to the gas being reintroduced into the primary 10 and secondary 20 combustion chambers. As part of the unique control algorithms employed in the system and process, the primary 10 and secondary 20 combustion chambers are monitored for their specific oxygen saturation while flow controllers 74, 76 are used to regulate the recirculation, thereby adjusting oxygen levels, in order to achieve maximum efficiency. This rigorous control, particularly of oxygen levels, virtually eliminates the production of dioxin within the system.

The activated carbon filter 78 within recirculated flue gas streams 26, 36 is a preferred feature of one or more preferred embodiments of the invention. When an additional carbon source is available and the recirculated flue gases in streams 26, 36 are at or above 450° F., carbon dioxide present in the flue gas is converted to carbon monoxide. The carbon monoxide is generated through the Boudouard reaction ($C+CO_2 \rightarrow 2CO$) from the additional carbon available in the activated carbon filter 78 and the carbon dioxide present in recirculated flue gas streams 26, 36. The additional carbon monoxide generated increases the overall energy production and efficiency of system/process. Because waste residual heat is used to carry out the endothermic Boudouard reaction, no negative loss in heat gain is experienced in the primary 10 or secondary 20 combustion chambers. The amount of carbon consumed as a filter medium in activated carbon filter 78 is determined by the mass flow rate of recirculated flue gas which is further determined by the total gas flow rate of the system/process. Thus, the carbon within activated carbon filter 78 is a continuous feed system, similar to the reactant in a scrubbing system. While activated carbon filter 78 is shown in FIG. 1A as being a single unit, separate filter units may be employed for each of the streams 26, 36. Alternatively, the activated carbon filter unit 78 may be employed on only one of the streams 26, 36.

The system and process of a preferred embodiment are optimized to consume the carbon filter medium, and thereby produce maximum energy, by regulating the recirculated gas streams 26, 36 to a specific mole ratio. No matter what hydrocarbon feedstock is used, the recirculated gas streams 26, 36 are maintained at approximately one mole carbon dioxide and one mole water per six moles of fresh hydrocarbon feedstock 21. With this recirculation rate, the system/process exhibits the characteristics of an auto-thermal exothermic gasification reaction in the primary combustion chamber 10 and an exothermic stoichiometric oxidation reaction in the secondary combustion chamber 20. The complete reaction also yields an excess amount of energy which is more than the stated higher heating value of that particular feedstock (i.e., when the standard feedstock is used in a conventional ambient air boiler). This excess amount of energy is due to the additional carbon monoxide generated through the Boudouard reaction, which consumes the sacrificial carbon of activated carbon filter 78. In the event that carbon monoxide cannot be generated through the Boudouard reaction as described above, elemental carbon may be injected directly into the hot reaction product stream 38 prior to the energy recovery boiler 14. This will create the carbon monoxide desired in the recirculated gas streams 26, 36 and which would otherwise have been generated within the activated carbon filter 78. Additionally, some methane gas is generated as part of this process from the hydrogen in the recirculated gas; however, the energy created from this side reaction does not significantly add to the energy output of the overall process. The flue gas stream is recirculated in a closed loop so that no gases are released to the atmosphere. The flue gas purged from the closed loop is further refined for reuse in the process or sale as a process byproduct.

Acid gases will not buildup if the temperature is maintained above the acid gas dew point. Thus, the recirculated flue gas temperature is preferably maintained between 450° to 485° F. to eliminate the problem associated with the build up of acid gases. The water in the recirculated gas streams 26, 36 has the effect of moderating the internal temperature as well as providing a mechanism for the removal of sulfurs or metals from the system. The water in the recirculated gas streams 26, 36 also provides a mechanism for the removal of acid buildup, such as hydrochloric acid buildup, formed during the oxidation of halogenated feedstocks.

As previously mentioned, the bulk portion of reaction product stream 41 exits combustion gas manifold 70 as stream 42. Stream 42 comprises carbon dioxide, water, and various other impurities and unreacted components from the combustion process. Stream 42 is introduced into electron beam reactor 80 to break down residual dilute organic compounds. Electron beam reactor 80 also imparts an electrical charge on any residual particulate matter in stream 42. Electron beam reactor 80 is of a variety commonly known and available to those skilled in the art. Stream 42 then enters ozone oxidation chamber 82 where additional components are oxidized and removal of same from the gas stream is aided. After ozone oxidation chamber 82, stream 42 is introduced into an electrostatic precipitator and catalytic reactor 84. In precipitator 84, additional particulate matter is removed from stream 42, including the particulate matter electrically charged by electron beam reactor 80.

Figure 1B:
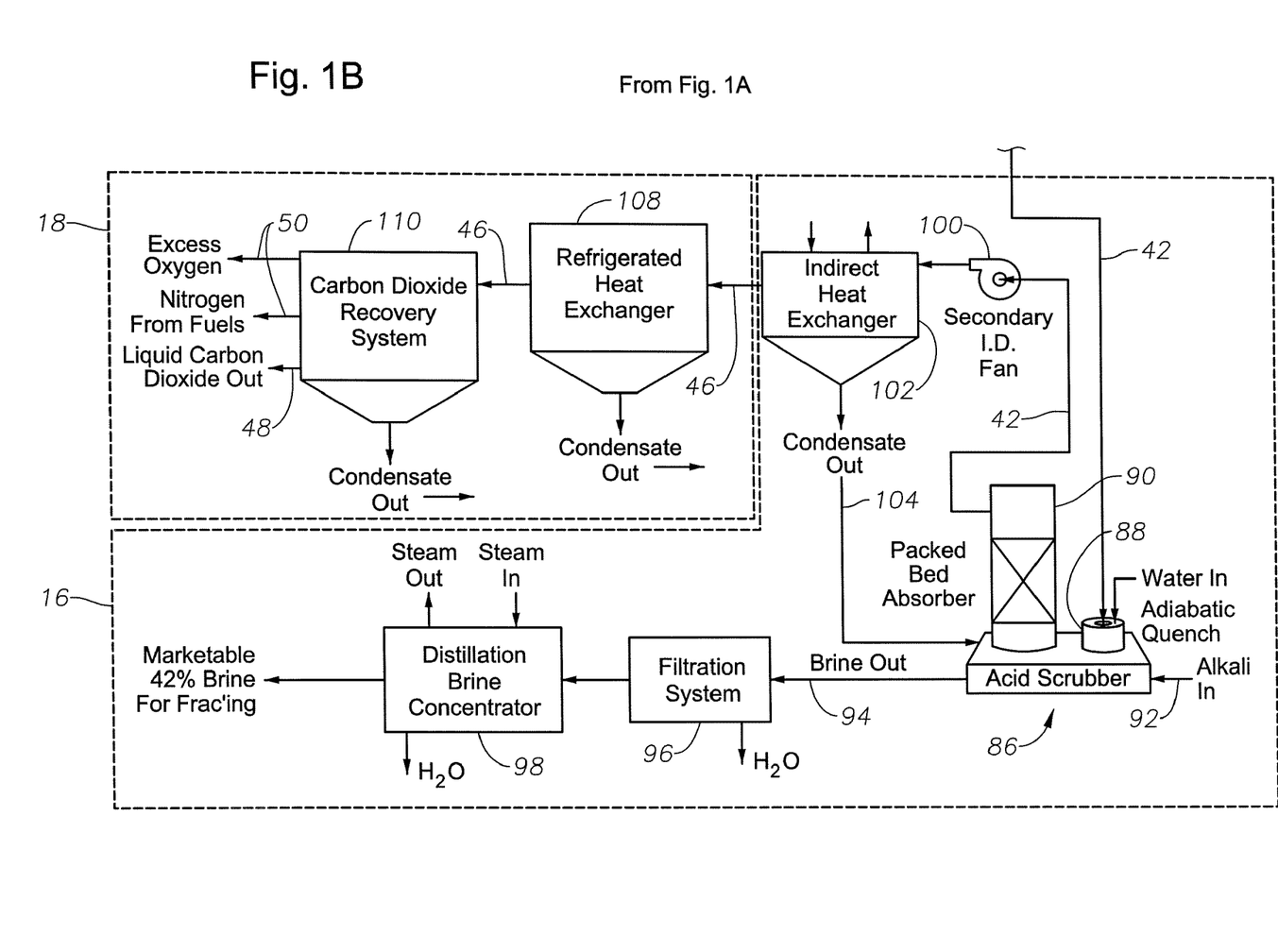

As illustrated in FIG. 1B, stream 42 is next introduced into acid scrubber system 86 to remove any remaining acidic constituents in the gas stream. Acid scrubber system 86 comprises an adiabatic quench 88 and pack bed absorber 90. Acid scrubber system 86 is of a design commonly known to those skilled in the art of purifying gas streams. Pack bed absorber 90 employs an alkaline stream 92 in a countercurrent flow arrangement to neutralize any acidic components within stream 42. Optionally, acid scrubber system 86 may comprise a series of pack bed absorbers 90 to increase contact efficiency. The brine stream 94, which results from a contact of the alkaline stream 92 with the acid gas components, can then be filtered in filtration system 96. Stream 94 is concentrated in distillation brine concentrator 98 to produce, for example, a marketable 42% brine stream for use in downhole hydrocarbon production, such as fracturing operations.

Upon exiting acid scrubber system 86, the pressure of stream 42 is increased by fan 100 and introduced into indirect heat exchanger 102. Indirect heat exchanger 102 is of a variety commonly known to those skilled in the art of heat transfer. Preferably, ground water at approximately 55° F. is used to condense water vapor from stream 42. The condensation of water vapor also assists in the removal of any remaining contaminates in the gas stream. Additionally, a condensate stream 104 comprising the water and any residual contaminants is returned to acid scrubber system 86 where it is combined with the brine.

Carbon dioxide stream 46 from the indirect heat exchanger 102 is introduced into $CO_2$ recovery system 18. Initially, stream 46 enters a refrigeration heat exchanger 108. Stream 46 then enters carbon dioxide recovery system 110 where liquid carbon dioxide is separated from any excess oxygen or nitrogen remaining in stream 46. Carbon dioxide recovery system 110 is of a design commonly known to those of ordinary skill in the art. As can be seen, liquid carbon dioxide stream 48 can be marketed as a saleable product. Finally, gas discharge stream 50 comprising excess oxygen and any nitrogen originally introduced through hydrocarbon feedstock streams 21 and 30 can be discharged to the atmosphere. Alternatively, the excess oxygen may be reused within the process as an oxidant or separated for bottling and sale as a product gas. Likewise, the excess nitrogen may be reused within the process as a gaseous fire blanket at the feedstock input or separated for bottling and sale as a product gas. When the process is operated under the conditions described herein, gas discharge stream 50 is eliminated or substantially reduced in comparison to prior art combustion processes.

By utilizing pure oxygen for gasification/oxidation as well as employing water injection and recirculation gas to moderate reaction temperatures, a preferred embodiment of the invention allows virtually all reaction products to be reused or marketed. These reaction products include carbon dioxide, water, and excess oxygen. In a preferred embodiment of the invention, provision is made to maintain the highest possible gasification/oxidation efficiency in order to reduce the level of trace organic compounds in the reaction products. Provision is also made to remove, with high efficiency, any acidic and particulate constituents produced by the combustion of less than ideal hydrocarbon feedstocks in the process, thereby allowing the recovery of reusable and marketable reaction products.

The operating temperatures for preferred embodiments of the invention range from 450° F. as a low temperature in the primary combustion chamber 10 to a high temperature of nearly 6,000° F. in the secondary combustion chamber 20, depending upon the hydrocarbon feedstock used and the desired combustion products. Elemental carbon, for example, becomes volatile at temperatures well below the minimum operational temperature (i.e., 450° F.) of the primary combustion chamber 10. The extremely high operating temperatures of the primary 10 and secondary 20 combustion chambers are possible because the gasification and oxidation processes are conducted using pure oxygen 22 rather than atmospheric air. The absence of atmospheric nitrogen allows the hydrocarbon feedstock 21 to oxidize at high heat within the pure oxygen environment. As a result, the reaction is auto-thermal. A preferred embodiment of the invention is designed with a high operating temperature and a low operating pressure (i.e., below atmospheric pressure) in order to facilitate hydrocarbon reactions wherein: (1) the carbon molecule first bonds with, or associates with, oxygen as a primary reaction, (2) the carbon molecule then associates with hydrogen as a second reaction, and finally, (3) any remaining carbon is bonded or associated with water as a last reaction. Thus, the high operating temperature and low operating pressure of the system/process drive the process selectivity and provide an affinity for the production of carbon monoxide and hydrogen gases. Polymerization of water also releases hydrogen free radicals that assist in system efficiency; however, the production of carbon monoxide and hydrogen gases is the primary aim of the process.

The actual energy release from particular hydrocarbon feedstocks is dependent on several variables affecting the previously described system and process. System variables, such as feedstock/fuel flow, oxygen flow, recirculation flow, control temperature set points and oxygen sensor set points, are controllable. The manner in which these system variables may be controlled to operate and optimize gasification and oxidation of hydrocarbon feedstocks is commonly known by those skilled in the art and will not be discussed further herein. However, the particular hydrocarbon feedstock that is gasified (in the primary combustion chamber 10) and subsequently oxidized (in the secondary combustion chamber 20) is the single largest factor determining the amount of energy that may be produced using the system/process. A more complex hydrocarbon molecule naturally produces a higher energy value, one which is further increased through the novel recirculation of flue gas and the Boudouard reaction. For example, as verified by fuel gasification research at Los Alamos National Laboratory, six moles of methane produces 1.48 times the energy yield in the system/process of the invention, and six moles of western coal produces 2.51 times the energy yield in the system/process of the invention, than could be attained through conventional combustion of each respective hydrocarbon feedstock in a standard boiler system.

As shown in FIG. 1A, the heat energy created and recovered from the system is used in an energy recovery boiler 14, such as a heat recovery steam generator, to generate high and/or low pressure steam. The high and/or low pressure steam is used in steam turbine 130 to generate electrical power via generator 132. Steam leaving the steam turbine 130 is condensed in condenser 136 and returned as boiler feedwater 134 to the energy recovery boiler 14 via boiler feedwater preheater 138. The generation of steam and power from heat energy is well known in the art and will not be further discussed herein. The overall power production process is much more energy efficient than conventional systems/processes, because the natural resources consumed in the system/process are minimized, the products produced therefrom are marketable, and virtually no atmospheric or water emissions from the process are released to the environment.

Figure 2:
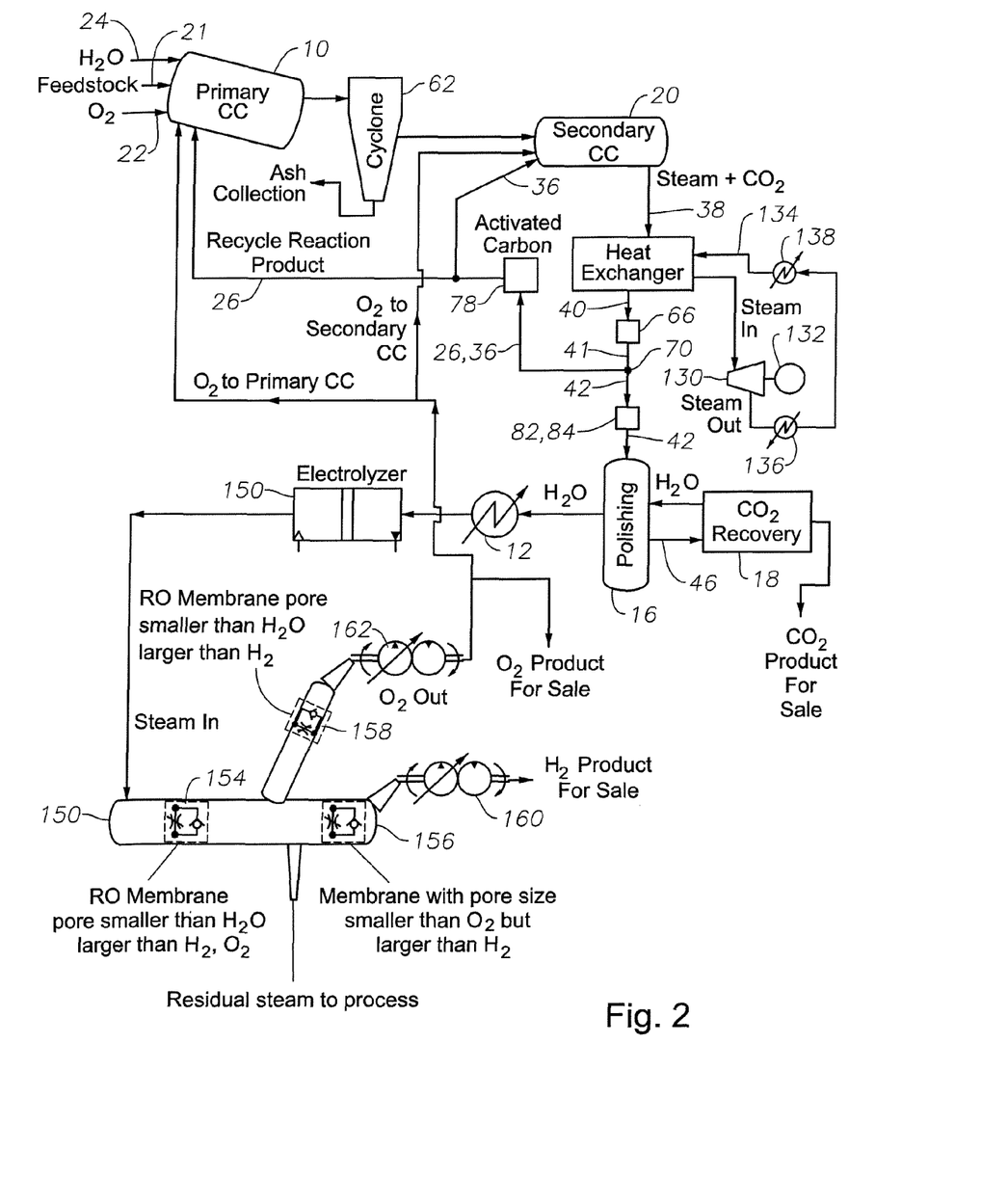
FIG. 2 is a simplistic schematic of the system and process of FIGS. 1A and 1B that further illustrates a preferred implementation of the system and process to produce oxygen and hydrogen gases through the electrolysis of recovered water quench and/or water product and to separate the produced oxygen and hydrogen gases using a membrane separation technology.

In a preferred embodiment of the invention as shown in FIG. 2, the product water from the gasification/oxidation process is collected from polishing unit 16 (FIG. 1B). The product water consists of the recovered water quench and/or the water product formed from the complete combustion of various hydrocarbon feedstocks in the primary 10 and secondary 20 chambers. Preferably, as shown in FIG. 2, the product water is sent as steam to an electrolyzer or electrostatic precipitator unit 150 wherein the water molecules are split into oxygen and hydrogen gases by an electric current. A heat exchanger 12 is optionally used to generate the steam feed to electrolyzer 150. The steam feed preferably has a temperature of about 250° F. and a pressure of about 200 psi. Stream 38 (FIG. 1A) may be used to heat the product water into steam via heat exchanger 12. The electrolyzer or electrostatic precipitator 150 electrically charges the water vapor, which causes the water molecules to become unstable, break apart, and reform as oxygen and hydrogen gases. In essence, the product water is converted into oxygen and hydrogen gases through the input of additional energy in the form of low cost electricity. The electrolyzer preferably operates with a low voltage of +/−6 volts DC. The mixed oxygen and hydrogen gases and any entrained water vapor are then routed to a separation unit 152 for subsequent separation into their respective pure component gases.

A membrane separation unit 152 is preferred for use in separating the oxygen and hydrogen gases and any entrained water vapor. Membrane separation technology is well known in the art and will only be briefly described herein. Membrane separation technology is based on the differing sizes of gas molecules to be separated. The synthetic membrane of the membrane unit 152 is arranged and designed so that its membrane pores are sized large enough to allow the desired gas molecules to pass through the membrane pores while preventing the passage of undesired gas molecules. Because membrane separation units are passive gas separation systems, the units produce relatively high purity gas separations but at much lower expense than other gas separation technologies. While membrane separation technology is preferred, other gas separation technologies, such as pressure swing adsorption, etc., may be equally employed to remove any entrained water vapor as well as separate the oxygen and hydrogen gases generated in the electrolysis unit 150.

As shown in FIG. 2, the membrane separation unit 152 preferably comprises at least three separate membranes 154, 156, 158. The first membrane 154 of the membrane separation unit is arranged and designed with membrane pores sized to allow the smaller hydrogen and oxygen gas molecules to pass therethrough while retaining, and thus separating, any entrained larger water vapor molecules. The recovered water vapor is collected and routed back to the process for subsequent reuse. The second membrane 156 of the membrane separation unit is arranged and designed with membrane pores sized to allow hydrogen gas molecules to pass therethrough while retaining, and thus separating, the larger oxygen gas molecules. After an optional polishing and/or compression step 160, the purified hydrogen gas is bottled or otherwise sold as value added product. The recovered oxygen gas is further purified by sending the gas through a third membrane 158 which prevents the passage of any additional water vapor that may be present as a result of water reformation. The recovered water vapor is collected and routed back to the process for subsequent reuse. After an optional polishing and/or compression step 162, the purified oxygen gas is either bottled or otherwise sold as value added product or routed back to the process as a feedstock in the primary 10 and/or secondary 20 combustion chambers.

The operating temperature (i.e., preferably above the dew point of water) and pressure (i.e., preferably above atmospheric) of the three membranes 154, 156, 158 are optimized to achieve the desired degree of separation. Likewise, a vacuum (not shown) may be drawn on the backside of the membranes 154, 156, 158 in order to enhance the recovery of desired molecules through the membranes 154, 156, 158. While three separate membranes 154, 156, 158 are described herein, the invention is not limited to any particular number or arrangement of membranes. As is well known in the art, two or more membranes may be arranged in a series and/or parallel structure to produce the desired component separation and/or purification standards.

The Abstract of the disclosure is written solely for providing the United States Patent and Trademark Office and the public at large with a means by which to determine quickly from a cursory inspection the nature and gist of the technical disclosure, and it represents solely one preferred implementation of the invention and is not indicative of the nature of the invention as a whole.

While some embodiments of the invention have been illustrated in detail, the invention is not limited to the embodiments shown; modifications and adaptations of the above embodiment may occur to those skilled in the art. Such modifications and adaptations are in the spirit and scope of the invention as set forth herein:

I claim:

1. A process for combusting hydrocarbon feedstock streams, recovering the water and carbon dioxide produced during combustion, and generating oxygen and hydrogen gases from the recovered water, the process comprising the steps of:
   reacting a hydrocarbon feedstock-containing stream with a stream of substantially pure oxygen in a combustion chamber under conditions producing a reaction product stream comprising carbon dioxide and water vapor;
   removing particulate matter from the reaction product stream;
   separating the reaction product stream into a recycle stream and an intermediate product stream;
   sending the recycle stream back into the combustion chamber after first passing the recycle stream through activated carbon;
   scrubbing the intermediate product stream to neutralize and remove acidic impurities;
   condensing water vapor from the intermediate product stream;
   refrigerating the intermediate product stream to condense any remaining water and to liquefy the carbon dioxide;
   generating steam from the condensed water;
   electrolyzing the steam to produce oxygen and hydrogen gases; and
   separating the oxygen and hydrogen gases.

2. The process of claim 1 wherein,
   said reacting step occurs in two stages, a first stage comprising reacting the hydrocarbon feedstock-containing stream with the stream of substantially pure oxygen in a first combustion chamber to produce a first product stream and a second stage comprising reacting the first product stream from the first stage with another stream of substantially pure oxygen in a second combustion chamber to produce the reaction product stream comprising carbon dioxide and water vapor.

3. The process of claim 2 wherein,
   said sending step comprises sending a portion of the recycle stream into each of the first and second combustion chambers after first passing the recycle stream through activated carbon.

4. The process of claim 1 further comprising the step of:
   transferring heat energy from the reaction product stream to a boiler for generating steam.

5. The process of claim 4 further comprising the step of:
   using the generated steam in a steam turbine arranged and designed to drive a generator for generating electrical power.

6. The process of claim 1 wherein,
   said step of separating the oxygen and hydrogen gases uses a membrane to separate the oxygen and hydrogen gases.

7. The process of claim 1 further comprising the step of:
   sending at least a portion of the separated oxygen back to the combustion chamber as at least a portion of the substantially pure oxygen stream.

8. The process of claim 1 wherein,
   said scrubbing step comprises scrubbing the intermediate product stream with an alkaline solution and thereby generating a brine solution.

9. The process of claim 1 further comprising the step of:
   introducing a water stream into the combustion chamber.

10. The process of claim 1 further comprising the steps of:
    subjecting the intermediate product stream to electron beam oxidation to breakdown residual organic compounds and to electrostatically charge residual particulate matter; and
    removing the electrostatically charged particulate matter from the intermediate product stream.

11. A system for combusting hydrocarbon feedstock streams, recovering the water and carbon dioxide produced during combustion, and generating oxygen and hydrogen gases from the recovered water, the system comprising:
    a combustion chamber for reacting a hydrocarbon feedstock-containing stream and a substantially pure oxygen stream;
    a first heat exchanger in fluid communication with said combustion chamber, said first heat exchanger for recovering heat from reaction products of said combustion chamber;
    a bag house, downstream of said first heat exchanger, for removing particulate from the reaction products;
    a reaction product manifold in fluid communication with said bag house, said manifold comprising a first recirculation line for recycling a portion of the reaction products to said combustion chamber, and a second line carrying remaining reaction products;
    an activated carbon filter in fluid communication with said bag house and said combustion chamber, said activated carbon filter positioned between said manifold and said combustion chamber and arranged and designed to allow the recycled portion of the reaction products of said first recirculation line to flow therethrough;

a scrubbing column in fluid communication with said second line;

a condenser, downstream of said scrubbing column, for condensing water from the remaining reaction products;

a purification unit, downstream of said condenser, for purifying carbon dioxide from the remaining reaction products;

a second heat exchanger in fluid communication with said condenser, said second heat exchanger arranged and designed to generate steam from the water condensed by said condenser;

an electrolyzer, downstream of said second heat exchanger, for electrolyzing the steam and generating oxygen and hydrogen gases therefrom; and a separation unit, downstream of said electrolyzer, for separating the oxygen and hydrogen gases.

12. The system of claim 11 wherein, said combustion chamber comprises two chambers, a first combustion chamber for reacting the hydrocarbon feedstock-containing stream with the stream of substantially pure oxygen to produce a product stream and a second combustion chamber for reacting the product stream from said first combustion chamber with another stream of substantially pure oxygen to produce the reaction products.

13. The system of claim 12 wherein, said first recirculation line for recycling the portion of the reaction products is arranged and designed to recycle reaction products to both said first and second combustion chambers after first passing the portion of the reaction products of said first recirculation line through said activated carbon filter.

14. The system of claim 11 wherein, said first heat exchanger is a boiler for generating steam.

15. The system of claim 14 further comprising, a steam turbine arranged and designed to use the generated steam to drive a generator for generating electrical power.

16. The system of claim 11 wherein, said separation unit comprises a membrane.

17. The system of claim 11 wherein, said first and second heat exchangers are the same heat exchanger.

18. The system of claim 11 further comprising, an electronic beam reactor in fluid communication with said second line, downstream of said manifold, for breaking down residual organic compounds and to electrostatically charge residual particulate matter in the remaining reaction products; and an electrostatic precipitator, downstream of said beam reactor, for removing residual particulate matter electrostatically charged in said electronic beam reactor.

* * * * *